UNITED STATES PATENT OFFICE.

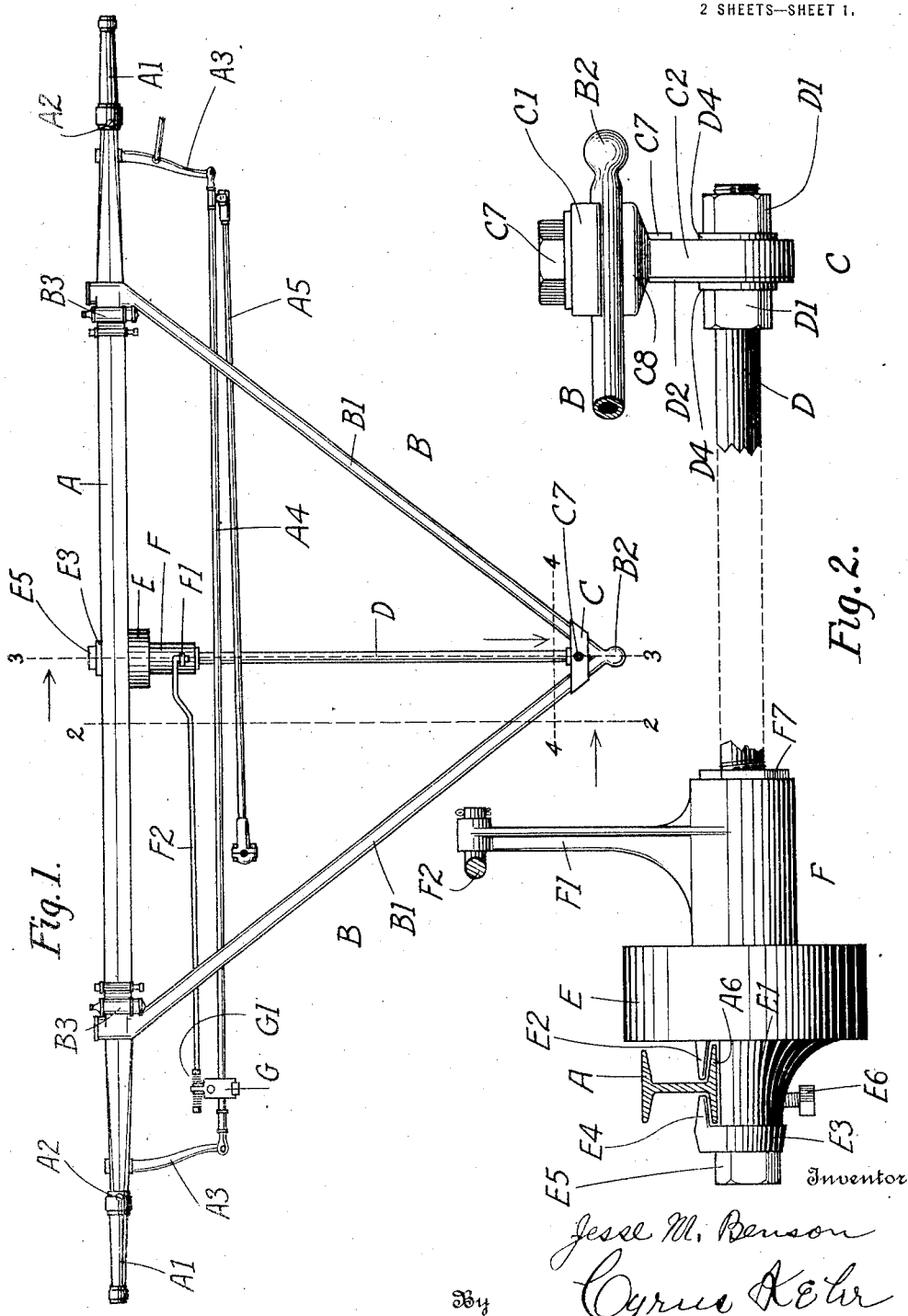

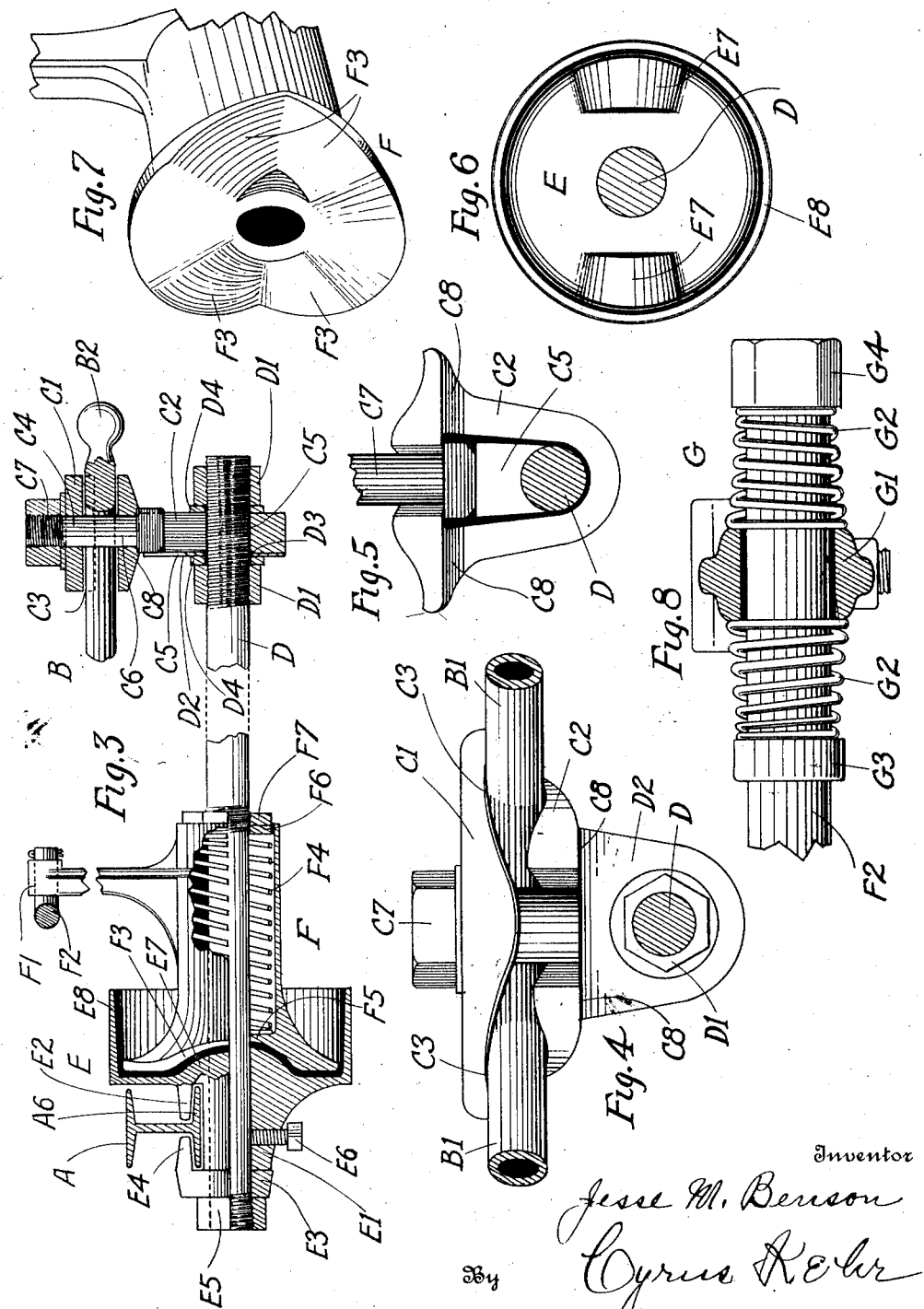

JESSE M. BENSON, OF CONCORD, TENNESSEE.

AUTOMOBILE STEERING MECHANISM.

1,349,653.  Specification of Letters Patent.  Patented Aug. 17, 1920.

Application filed January 3, 1916. Serial No. 69,861.

*To all whom it may concern:*

Be it known that I, JESSE M. BENSON, a citizen of the United States, residing at Concord, in the county of Knox and State of Tennessee, have invented a new and useful Improvement in Automobile Steering Mechanism, of which the following is a specification, reference being had to the accompanying drawing.

My improvement relates particularly to the steering mechanism of automobiles and to mechanism for securing and controlling the front axles of automobiles.

The object of the improvement is to provide efficient mechanism which acts yieldingly to hold the front or guide wheels in alinement with the length of the automobile and to provide a simple and efficient means for supplementing the front radius rod and serving as a temporary substitute for the radius rod when either arm of the latter breaks.

In the accompanying drawings,

Figure 1 is a plan showing the front axle (or the axle to which the guide wheels are applied) and steering mechanism applied to said axle, including my improvement;

Fig. 2 is a section on the line, 2—2, of Fig. 1, looking toward the right, enlarged relative to Fig. 1, and portions being broken away;

Fig. 3 is a sectional view along the line, 3—3 of Fig. 1, looking toward the right, portions being in full section, and portions being broken away;

Fig. 4 is a section on the line, 4—4, of Fig. 1, looking in the direction of the arrow, the parts being relatively enlarged;

Fig. 5 is a view of the lower bracket member partially detached, looking in the direction of the arrow on the line, 4—4, of Fig. 1;

Fig. 6 is an elevation showing the interior of the stationary cam member, looking toward the left as shown in Fig. 3;

Fig. 7 is a perspective view of one end of the movable cam member, looking toward the right as shown in Fig. 3;

Fig. 8 is an upright sectional detail.

Referring to said drawings, A is the front axle or the axle to which the guide wheels (the wheels which support one end of the automobile and which are turned obliquely to an upright plane cutting the machine lengthwise) are applied. At each end of the axle is a guide wheel spindle $A^1$, hinged at $A^2$, on an upright axis. To each spindle is applied a spindle arm, $A^3$. Said arms are coupled to each other by the spindle connecting rod, $A^4$. The usual steering gear connecting rod, $A^5$, is connected by one end to the spindle connecting rod, $A^4$, and by the other end to members leading to the driver's hand wheel or similar member in the usual manner. Since these parts are well-known, it is deemed unnecessary to illustrate and describe them.

B is the radius rod, which comprises the two arms, $B^1$, and a spherical head, $B^2$, located at the angle formed by the arms. Said head extends into a stationary socket on the frame of the machine in the usual manner. The ends of the radius rod are secured to the axle by the radius rod clamps, $B^3$.

The parts thus far described are already known to the art and may, for example, be seen in five-passenger Ford automobiles. The mechanism constituting my improvement will now be described.

At the angle of the radius rod, immediately forward of the spherical head, $B^2$, a bracket, C, is applied to the radius rod. Said bracket consists of an upper member, $C^1$, and a lower member $C^2$. The upper member extends bridge-fashion across the arms, $B^1$, of the radius rod and has notches, $C^3$, into which said arms extend. At its middle, said member has an upright aperture, $C^4$. The lower member, $C^2$, is broadened and bears against the lower faces of the arms, $B^1$. Said member is extended downward and has an opening $C^5$, extending through said member from front to rear. Above said opening is an upright opening $C^6$, extending from the opening, $C^5$, through the upper face of the member, $C^2$. A bolt, $C^7$, extends through the aperture, $C^4$, and the opening, $C^6$, and between the arms, $B^1$, of the radius rod and firmly clamp said members to the radius rod. An auxiliary rod, D, extends through the opening, $C^5$, of the lower bracket member, $C^2$, and thence forward to the axle, A. At each side of the bracket member, $C^2$, a nut, $D^1$, is threaded around the auxiliary rod. At the forward face of the lower bracket member, a washer plate, $D^2$, surrounds the auxiliary rod and bears against shoulders, $C^8$, on the upper portion of the lower bracket member, whereby said plate is positioned. In said plate is an aperture, $D^3$, (Fig. 3) through which the auxiliary rod extends. Said aperture is of such size and position as to cause the auxiliary rod to lie in the lower portion of the opening, C⁵, of the lower bracket member when the bracket plate bears against the shoulders, C⁸. Between the washer plate and the adjacent nut, D¹, is an ordinary washer, D⁴, and between the member, C², and the other nut, D¹, is a similar washer D⁴. At its forward end, said auxiliary rod extends through and is immovably secured to the stationary cam member, E. The upper portion of the hub, E¹, of the cam member is flattened to form a face bearing against the lower face of the axle, A, said axle being an I-beam. Above said hub is a horizontal flange, E², extending across the adjacent lower flange, A⁶, of the axle. Forward of said hub a clamp plate, E³, loosely surrounds the auxiliary rod and has a horizontal flange, E⁴, extending across the adjacent portion of the flange, A⁶, of the axle, A. A nut, E⁵, is threaded around the auxiliary rod forward of said clamp plate. By turning said nut rearward, the clamp plate is driven toward the stationary cam member, E, and said two members are thus firmly bound to the axle; and since the auxiliary rod is immovably secured to the cam member, E, the auxiliary rod is immovably secured to the axle. To secure precise positioning of the bracket, C, on the radius rod, both nuts, D¹, may be suitably positioned by turning them on the auxiliary rod. The cam member, E, may be applied to the auxiliary rod by threading and securing it against rotation by means of a set bolt, E⁶, extending through the hub, E¹.

When thus secured, the rod, D, forms an auxiliary to the radius rod, B. Both arms of said rod are materially supported or reinforced with reference to strains applied by the axle A. Thus both of said arms are materially aided in resisting strains tending to break or bend said arms. Furthermore, if either of said arms should break, the auxiliary rod is present to temporarily coöperate with the other arm for maintaining the axle, A, in its normal position following the shock which caused the breaking of one of the arms, thereby maintaining the course of the automobile and preventing an accident of the kind occurring after an arm of the radius rod breaks in the absence of my auxiliary rod. It is well-known that, during some such accidents, the axle abruptly changes from its normal position, the body supporting springs to which said axle is connected being promptly bent or broken, and the automobile runs violently against an obstruction or pitches over an embankment, the automobile being entirely out of the control of the driver. By the use of my improved auxiliary rod, the danger of breaking an arm of the radius rod is much reduced, and when such a break does occur, the axle is held in its normal position and the automobile remains under the control of the driver.

To the auxiliary rod is applied mechanism which yieldingly resists movement of the guide wheel spindles out of their normal positions either forward or backward. Immediately at the rear of the stationary cam member, E, is a movable cam member, F. Said member surrounds the auxiliary rod and is free to rotate and to move endwise thereon. On said member, F, is a rocking arm, F¹, extending upward. A connecting rod, F², has one end coupled to the upper end of said arm and has its other end coupled to the spindle connecting rod, A⁴, near one end of the latter, the connecting rod, F², being approximately parallel to the spindle connecting rod. From the foregoing it will be seen that endwise movement of the spindle connecting rod, A⁴, will cause corresponding endwise movement of the connecting rod, F², and oscillation of the arm F¹, and partial rotation of the movable cam member, F. These parts are so proportioned as to bring the arm, F¹, into the upright position when the spindle connecting rod is in its middle position and the guide wheel spindles, A¹, stand parallel to the axle. Thus the spindles and the rocking arm move synchronously. Yielding resistance to the turning of the movable cam member, F, is applied to said member in such manner as to keep the arm, F¹, in the upright position and thereby keep the spindle connecting rod, A⁴, in the middle position and the guide wheel spindles parallel to the axle.

For this purpose, the cam members, E and F, are provided with inter-engaging cams which permit the member F, to occupy a certain position relative to the member, E when the arm, F¹, is in the upright position and which cause the movement of the member, F, endwise away from the member, E, when the member F, is partially rotated on the auxiliary rod. On the member, E, are cams, E⁷, which normally rest between cams, F³, on the member, F. When the member, F, is partially turned in either direction, one of the cams, F³, slides over the adjacent cam, E⁷, and forces the member, F, endwise away from the member, E. Within the member, F, an expanding coiled spring, F⁴, surrounds the auxiliary rod and bears by its forward end against an annular shoulder, F⁵, formed in the forward portion of the member, F. At the rear of said spring a washer, F⁶, surrounds the auxiliary rod and is of proper diameter to extend loosely into the rear end of the member, F, and form a slidable abutment for the rear end of the spring and also a support for centering the rear portion of the member, F. A nut F⁷, is threaded to the auxiliary rod and bears against said washer. By turning said nut, the pressure of the washer against the spring may be varied. The portion of the auxiliary rod to which the nut, F⁷, is applied must be formed enough thicker than the portion of said rod rearward of said place to permit forming the screw threads outside of a cylindrical space equaling the diameter of the portion of said rod rearward of said threads, in order that said nut may be turned rearward and released from said threads and then slipped rearward along said rod. The shoulder, F⁵, in addition to forming an abutment for the forward end of the spring, F⁴, forms a means for centering the forward end of the member, F, on the auxiliary rod.

On the stationary cam member, E, a flange, E⁸, extends rearward concentric with the auxiliary rod and surrounds the forward end of the member, F, for the purpose of keeping dirt from the cams, E⁷, and F³. In the form of the apparatus illustrated by the drawings, the connecting rod, F², is coupled to the left-hand end of the spindle connecting rod, A⁴, by means of a clamp bracket, G, secured to the rod, A⁴. On said bracket is an eye, G¹, through which the rod, F², extends loosely, the interior diameter of said eye being greater than the thickness of said rod. (See Fig. 8). At each side of the eye, the rod, F², is surrounded by an expanding coiled spring, G². On the adjacent end of the rod is a nut, G⁴, forming an abutment for the adjacent spring. At the opposite side of said eye, an annular shoulder, G³, forms an abutment for the other spring. These two springs together position the eye relative to the length of the rod, F²; and said springs are sufficiently strong to maintain such relation under ordinary conditions. Since the eye is larger than the rod, the rod and the eye may turn out of axial alinement without cramping the rod in the eye. Such movement out of axial alinement will cause the eye to slightly compress the springs; but this compression is so slight and is accomplished through such relatively long leverage (the length of the rod, F², against the radius of the eye) that the effective working of the parts is not hindered.

In this manner, a universal joint having sufficient range of movement for the action of the connecting rods, A⁴ and F², is formed. The structure of the mechanism forming said joint is simple and economical and makes its own adjustment to compensate for wear, the springs, G², at all times pressing against their abutments and against the eye, G¹, regardless of wearing of said members.

I claim as my invention:

1. In a vehicle, the combination with an axle and spindles on said axle and a radius rod comprising arms secured to said axle, of an auxiliary rod having one end secured to the radius rod at the angle of the latter and having its other end joined to the axle, a rocking member supported by said auxiliary rod, means placing said rocking member in operative relation with said spindles for synchronous movement, said rocking member being in the upright position when the spindles are parallel to the axle, substantially as described.

2. In a vehicle, the combination with an axle and spindles on said axle and a radius rod comprising arms secured to said axle, of an auxiliary rod having one end secured to the radius rod at the angle of the latter and having its other end joined to the axle, a movable cam member and a fixed cam member supported by said auxiliary rod, an arm on the movable cam member, means placing said arm in operative relation with said spindles for synchronous movement, said arm being in the upright position when the spindles are parallel to the axle, substantially as described.

In testimony whereof I have signed my name this 10th day of December, in the year one thousand nine hundred and fifteen.

JESSE M. BENSON.